United States Patent [19]
Rotter et al.

[11] 4,187,521
[45] Feb. 5, 1980

[54] DC ERASE HEAD

[75] Inventors: Gerhard Rotter, Mission Viejo, Calif.; Klaus D. Schomann, Frankfurt, Fed. Rep. of Germany

[73] Assignee: BASF Aktiengesellschaft, Rheinland-Pfalz, Fed. Rep. of Germany

[21] Appl. No.: 902,842

[22] Filed: May 4, 1978

[51] Int. Cl.² .......................... G11B 5/02; G11B 5/47
[52] U.S. Cl. ...................................... 360/118; 360/66; 361/151
[58] Field of Search ...................... 360/118, 128–130, 360/66, 122; 317/157.5 MR; 361/151, 149, 267

[56] References Cited
U.S. PATENT DOCUMENTS

| | | | |
|---|---|---|---|
| 2,736,776 | 2/1956 | Camras | 360/129 |
| 3,105,965 | 10/1963 | Joannou | 360/129 |
| 3,521,006 | 7/1970 | Michael | 360/129 |
| 3,542,971 | 11/1970 | Willard | 360/129 |
| 3,852,812 | 12/1974 | Reisfeld | 360/66 |
| 4,038,692 | 7/1977 | Umeda et al. | 360/66 |

OTHER PUBLICATIONS

IBM Tech. Disc. Bull., L. E. Ambrico, Undiased Erasure, vol. 9, No. 7, Dec. 1966, p. 764.

*Primary Examiner*—Alfred H. Eddleman
*Attorney, Agent, or Firm*—Fulwider, Patton, Rieber, Lee & Utecht

[57] ABSTRACT

An erase head for erasing single tracks on multi-track magnetic recording tapes by means of a constant magnetic field applied in a direction perpendicular to the direction of tape travel, to avoid any asymmetrical residual magnetization with respect to the direction of a magnetizing field used for recording. A configuration of two pole pieces and two corresponding shields, spaced out from the pole pieces and generally coplanar with the end faces thereof, ensures that the magnetic field strength is relatively uniform in a region between the shields, and falls to a relatively low value outside this region.

5 Claims, 4 Drawing Figures

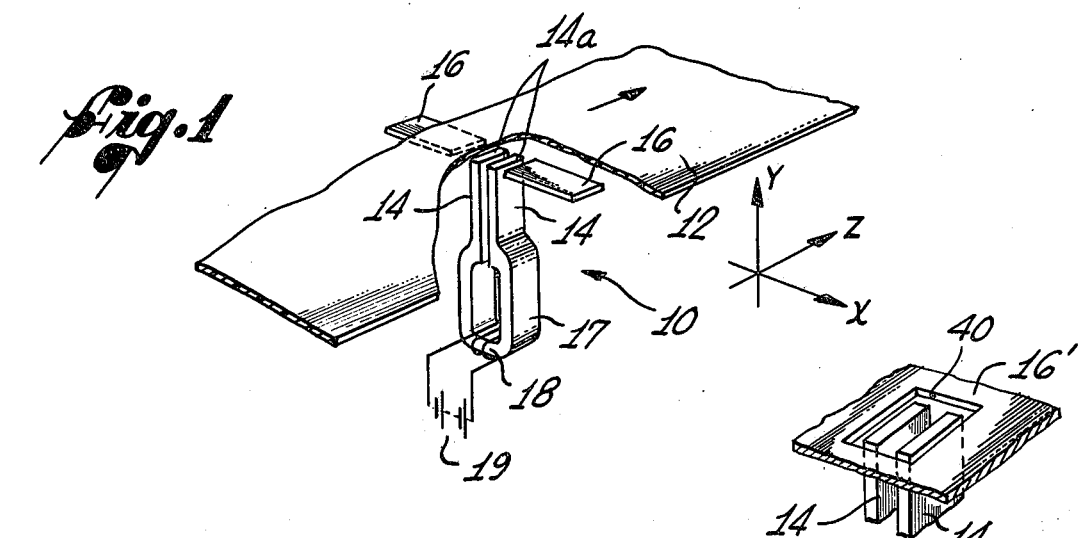
Fig.1
Fig.1a
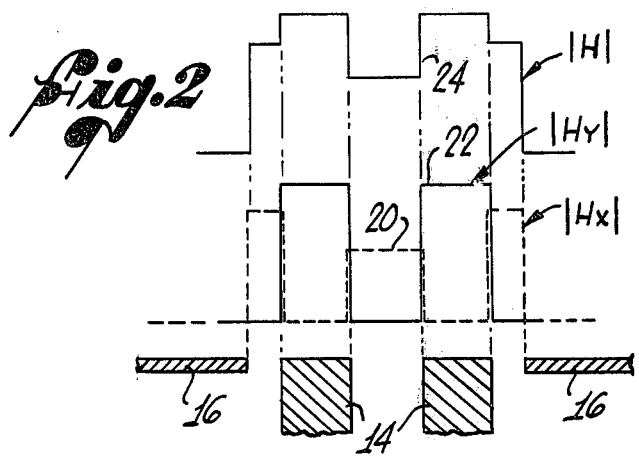
Fig.2
Fig.3
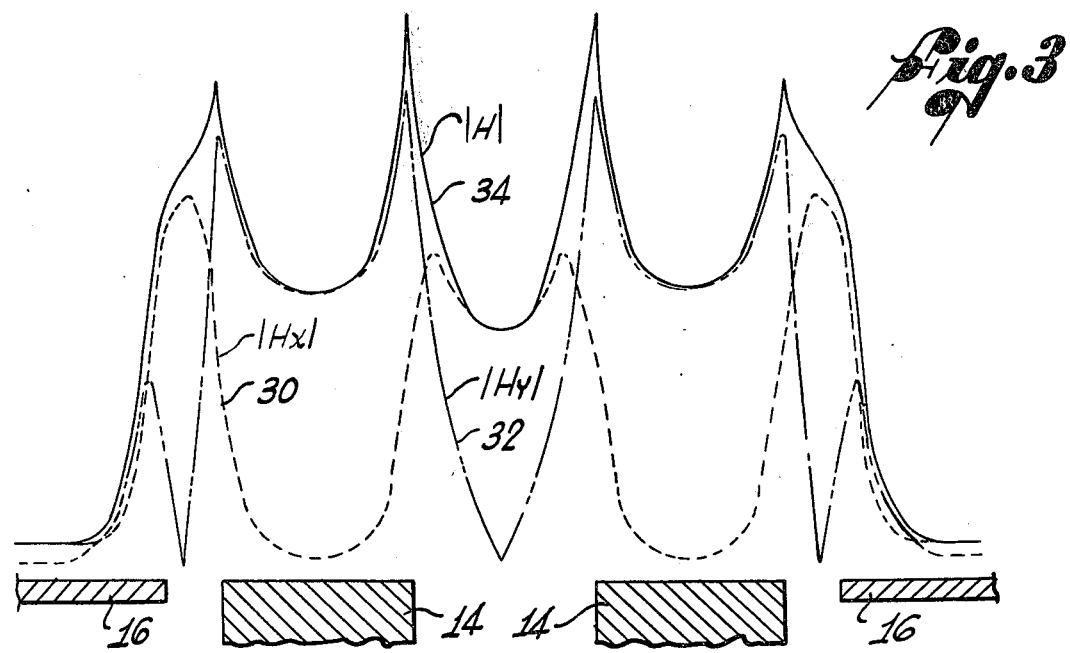

DC ERASE HEAD

BACKGROUND OF THE INVENTION

This invention relates generally to electromagnetic devices for erasing recorded information from magnetic recording tape, and, more particularly, to such devices of the type operated by direct current (dc).

Typically, tape recording systems include an erase head mounted in a leading position with respect to a recording transducer head, so that previously recorded material on the tape will be erased immediately before new material is recorded. It is well known that magnetic materials, including those used to coat magnetic recording tapes, exhibit a property known as hysteresis, wherein they will retain a degree of residual magnetism after a magnetizing or magnetomotive force is removed. Accordingly, if a constant magnetic field were to be applied in a direction generally parallel to the direction of movement of the tape, each particle of magnetic material on the tape would be subjected to a gradually increasing magnetic field strength as it approached the constant field, and to a gradually decreasing magnetic field strength as it moved away from the field. However, because of the effect of hysteresis, each such particle of magnetic material would remain partially magnetized in the direction of the constant magnetic field.

The aforedescribed asymmetry in the direction of magnetization of a tape erased by a constant magnetic field is of little consequence in some magnetic recording applications, such as digital recording, but is highly significant in the recording of analog signals, as in video tape recorders. In analog recording, the asymmetry can give rise to distortion in the recorded and subsequently played back video signal. This distortion manifests itself by the presence of unwanted second harmonic components, and is totally unacceptable for video applications.

For the foregoing reason, video and audio tape recorders typically employ high-frequency, alternating-current (ac) erase heads. As each particle of magnetic material approaches an ac erase head, it is subjected to rapid magnetization in alternating directions. Because of the hystersis effect, the degree to which the particle is magnetized lags behind the cyclic variation in the magnetizing force, and the relationship between magnetic field strength and magnetizing force follows a well known characteristic hystersis loop. As the particle moves away from the ac erase head, the magnitude of the magnetizing force gradually diminishes, and the hystersis loop becomes progressively smaller and smaller, until, when the particle has escaped the influence of the field, it remains in an essentially neutral magnetic condition, without any asymmetrical magnetic bias in one direction or another.

Although ac erase heads are entirely satisfactory for most purposes, they have the disadvantage of relatively high cost as compared with a comparable dc erase head. Furthermore, an ac erase head must be provided with power from a high-frequency power source, and there is a significant problem in dealing with unwanted radiation from the source. Accordingly, appropriate shielding has to be provided, at a correspondingly higher cost.

It will be appreciated from the foregoing that there is still a significant need for a practical alternative to the more conventional ac erase head for magnetic tape recording, and such an alternative should not have the inherent disadvantage of asymmetrical magnetization, usually associated with dc erase heads, and should still be capable of erasing a single, relatively narrow recording track on a multi-track tape. The present invention fulfills this need.

SUMMARY OF THE INVENTION

The present invention resides in a magnetic recording tape erase head powered by direct current and oriented to provide a constant magnetic field substantially perpendicular to the direction of tape travel. Although the tape erased by the erase head of the invention is left permanently magnetized in the perpendicular direction, there is no asymmetry in the longitudinal direction, parallel to the tape length, and hence no distortion, because the recording head utilizes a magnetizing field in the longitudinal direction. The erase head of the invention has an arrangement of pole pieces and shields which provides a substantially uniform field over a relatively narrow portion of the tape width, corresponding to the width of a single recording track on the tape.

Basically, and in general terms, the erase head of the invention comprises a pair of relatively narrow pole pieces having end faces which engage the surface of the magnetic tape, to provide a magnetic field in a direction transverse to the direction of tape movement, and a pair of flat magnetic shields positioned in a generally coplanar relationship with the end faces of the pole pieces and spaced apart therefrom, to minimize the effect of stray magnetic fields which would otherwise demagnetize adjacent tracks on the recording tape. The invention apparatus also includes a magnetic circuit coupling the two pole pieces, and means for providing a constant magnetizing force to the magnetic circuit. The relative spacing of the pole pieces, and of the shields with respect to the pole pieces, can be optimized to provide a substantially uniform magnetic field strength in the regions between the edges of the shields. The constant magnetic field thereby provided still leaves particles of magnetic material residually magnetized in the direction across the width of the tape, but this has no adverse effect on the recording characteristics of the tape, since the recording and playback transducers utilize a magnetic field oriented in the direction of tape movement.

It will be apparent from the foregoing that the present invention provides a simple and less costly alternative to ac demagnetization of recording tapes. In particular, it provides a magnetic field across a relatively small width of the tape, so that recording tracks adjacent to the one that is to be demagnetized are protected from inadvertent demagnetization. Other aspects and advantages of the present invention will become apparent from the following more detailed description, taken in conjunction with the accompanying drawings.

BRIEF DESCRIPTION OF THE DRAWINGS

FIG. 1 is a simplified perspective view of an erase head constructed in accordance with the present invention;

FIG. 1a is a fragmentary perspective view of an alternative form of the erase head of the invention;

FIG. 2 is a simplified graph showing the variation of magnetic field strength experienced by the tape as it passes the erase head of the invention; and FIG. 3 is a graph similar to FIG. 2, but providing a more practical example of the variation of field strength across the erase head of the invention.

DESCRIPTION OF THE PREFERRED EMBODIMENT

As shown in the drawings for purposes of illustration, the present invention relates to a direct current erase head for demagnetization of magnetic recording tapes. Substitution of a direct current (dc) erase head for the more commonly used alternating current (ac) erase head has previously been thought to be impractical, because a constant magnetizing force applied parallel to the direction of tape travel results in an asymmetrical residual magnetism of particles of magnetic material on the tape. Although this asymmetry can be avoided by orienting the erase head at right-angles to the direction of tape movement, this results in a relatively wide magnetic field, with the consequent demagnetization of adjacent tracks on multi-track recording tapes. Each recording track may be as little as four thousandths of an inch wide, with a safety zone of an additional two thousandths of an inch between tracks.

In accordance with the present invention, a direct-current erase head, indicated by reference numeral 10, is oriented at right angles to the direction of travel of a recording tape 12, and is provided with a configuration of pole pieces 14 and shielding elements 16 which cooperate to provide a substantially constant magnetic field across a relatively narrow width of the tape, and only a very small magnetic field outside the desired width to be demagnetized.

More specifically, the erase head 10 of the invention comprises two relatively narrow pole pieces 14 having flat, preferably rectangular end faces 14a oriented in a parallel relationship with each other and with the direction of movement of the recording tape 12. The end faces 14a are positioned in surface contact with the tape 12, or in very close proximity to it, and there is a narrow gap between parallel adjacent edges of the end faces. Thus, the magnetic field from the pole pieces 14 is oriented primarily at right-angles to the direction of tape movement. On each side of the pair of pole pieces 14 is a flat magnetic shield 16 arranged in generally coplanar relationship with the end faces 14a of the pole pieces. Each shield 16 has its edge closest to the pole pieces spaced apart therefrom and also oriented generally parallel to the direction of tape travel. The shields 16 operate to eliminate practically all of the fringing or leakage flux paths from the pole pieces 14, and to provide a very low level of magnetic field strength in the regions of the tape immediately adjacent to the shields. Connecting the pole pieces 14 is a generally U-shaped magnetic core 17, on which is wound a magnetizing winding 18, supplied by a dc power source, indicated at 19.

As indicated in FIG. 1, the primary direction of the magnetic field provided by the head 10 is designated as the x axis. The orthogonal directions of the y axis and z axis are defined as being perpendicular to the plane of the tape 12, and parallel to the tape movement direction, respectively. As will be apparent from FIG. 2, the component of magnetic field strength measured in the horizontal or x-axis direction is relatively high in the region between the pole pieces 14, falls to zero in the areas across the pole pieces and shields 16, and is also relatively high in the regions between the pole pieces and shields. The broken line 20 (FIG. 2) indicates the approximate magnitude, designated $H_x$, of the horizontal component of the magnetic field strength. Similarly, the solid line 22 indicates the corresponding variation in the vertical component of magnetic field strength, designated $H_y$, measured across the same region. It will be apparent that the magnitude of the vertical component field strength $H_y$ rises from close to zero outside the pole pieces 10 to a maximum value across the faces 16a of the pole pieces, but is substantially zero between the pole pieces.

The resultant field strength, H, is, of course, determined as the square root of the sum of the squares of the horizontal and vertical components. The value of H is separately plotted as the solid line 24 in FIG. 2. It will be seen that the field strength, H, between the edges of the shields 16 is substantially constant. As already mentioned, FIG. 2 is only an approximate illustration of the actual field strengths involved. In practice, the field strengths may vary as shown by way of example in FIG. 3, wherein the magnitude of the horizontal component of field strength, $H_x$, is indicated at 30, the magnitude of the vertical component of field strength, $H_y$, is indicated at 32 and the resultant, H, of the horizontal and vertical components is indicated at 34. The absolute spacing of the pole pieces 14 and the shields 16 will depend upon a variety of factors, such as the recording track width, the width of guard bands or safety zones between tracks, the desired field strength, and so forth. In general, however, it is a matter of relatively simple design technique to optimize the spacings between the pole pieces 14, and between the pole pieces and the shields 16, to obtain a relatively constant field strength across a desired tape width. Variations in field strength across the width the recording track are of little consequence, so long as the resultant field strength remains above a minimum level, which should be several times the value of the maximum field strength measured outside the recording track width.

The shields 16 may, in a variation of the preferred embodiment of the invention, be formed as a single continuous shield 16', shown in FIG. 1a, having a single aperture 40 therein to receive the two pole pieces 14. The continuous shield 16' eliminates the possibility of stray paths, through the air, between the two separate shields 16.

It will be appreciated from the foregoing that the present invention represents a significant advance in the field of magnetic recording. In particular, it provides a less costly alternative to demagnetization of recording tapes by alternating current means, and does so by obviating the disadvantages previously thought to be inherent in the use of direct current erase heads. It will also be appreciated that, although a particular embodiment of the invention has been described in detail for purposes of illustration, various modifications may be made without departing from the spirit and scope of the invention. Accordingly, the invention is not to be limited except as by the appended claims.

I claim:

1. An erase head for erasing recorded material from single tracks of a multi-track magnetic recording tape, said erase head comprising:

a pair of pole pieces having faces locatable in an operative relationship with respect to a moving magnetic recording tape, said faces being in a generally parallel relationship spaced across the width of the tape to provide a magnetic field directed primarily perpendicular to the direction of tape movement;

magnetic circuit means providing a low reluctance path between said pole pieces;

a source of constant magnetomotive force applied to said magnetic circuit means, to provide an unvarying magnetic field between said pole pieces; and magnetic shielding means spaced outwardly from said pole pieces in a substantially coplanar relationship with said faces, whereby the resultant magnetic field strength in a plane perpendicular to the direction of movement of the tape is substantially uniform in a region inward of said shielding means but is minimized outside the region.

2. An erase head as set forth in claim 1, wherein said magnetic shielding means includes a pair of flat metal plates spaced apart from each other by approximately the width of a single recording track to be erased.

3. An erase head as set forth in claim 1, wherein said magnetic shielding means includes a single flat metal plate having an aperture of approximately the same width as a single recording track, to accommodate said pole pieces.

4. An erase head as set forth in claim 1, wherein:

said pole pieces are parallel bars of rectangular cross section, and said faces locatable in an operative relationship with the tape are rectangular end faces;

said magnetic circuit means includes a generally U-shaped core joining the ends of said pole pieces opposite said rectangular end faces.

5. A direct-current erase head for erasing recorded material from single tracks of a multi-track magnetic recording tape, said erase head comprising:

a magnetic circuit having a generally U-shaped core of relatively low reluctance, a pair of pole pieces connected to said core and a magnetizing winding on said core supplied with direct current, wherein said pole pieces are parallel bars of substantially rectangular cross section, with substantially rectangular end faces locatable in an operative relationship with respect to a moving magnetic recording tape, to provide a magnetic field directed primarily across the width of the tape; and magnetic shielding means having planar portions located on each side of said pair of pole pieces, in the same plane as said end faces, whereby the component of magnetic field strength in a direction parallel to the plane of the tape is substantially zero in the regions adjacent to said end faces and adjacent to said shielding means, the component of field strength in a direction perpendicular to the plane of the tape is substantially zero except in the regions adjacent to said end faces, and the resultant field strength is relatively great in the region between the portions of said shielding means but is essentially zero elsewhere.

* * * * *